United States Patent
Bedell, Jr. et al.

(10) Patent No.: US 9,658,689 B2
(45) Date of Patent: *May 23, 2017

(54) INTERFACING VIA HEADS-UP DISPLAY USING EYE CONTACT

(71) Applicant: International Business Machines Corporation, Armonk, NY (US)

(72) Inventors: Stephen R. Bedell, Jr., Columbus, OH (US); Richard S. Gullo, Jr., Powell, OH (US); Andrew C. Myers, Columbus, OH (US); Casey M. O'Meilia, Dublin, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/836,074

(22) Filed: Aug. 26, 2015

(65) Prior Publication Data
US 2016/0246054 A1    Aug. 25, 2016

Related U.S. Application Data

(63) Continuation of application No. 14/628,693, filed on Feb. 23, 2015.

(51) Int. Cl.
*G02B 27/01* (2006.01)
*G06F 3/01* (2006.01)
(Continued)

(52) U.S. Cl.
CPC ............ *G06F 3/013* (2013.01); *G02B 27/01* (2013.01); *G02B 27/0101* (2013.01);
(Continued)

(58) Field of Classification Search
CPC ............................................ G06F 3/011–3/013
See application file for complete search history.

(56) References Cited

U.S. PATENT DOCUMENTS

2006/0093998 A1* 5/2006 Vertegaal ............... G06F 3/011
434/236
2007/0024579 A1 2/2007 Rosenburg
(Continued)

FOREIGN PATENT DOCUMENTS

EP        2824541 A1    1/2015
WO    2012037290 A2    3/2012

OTHER PUBLICATIONS

Forte, AG. et al.; "EyeDecrypt—Private Interactions in Plain Sight"; Security and Cryptography for Networks. 9th International Conference (SCN 2014) Proceedings: LNCS 8642.; pp. 255-276; 2014.

(Continued)

*Primary Examiner* — Dorothy Harris
(74) *Attorney, Agent, or Firm* — IBM End IPLaw

(57) ABSTRACT

According to one embodiment of the present invention, a system for device interaction via a heads-up display determines an area of sight of a first entity employing a first heads-up display, and establishes interaction between at least one first device and the first heads-up display in response to detecting at least an impact of the determined area of sight on at least one second device. Embodiments of the present invention further include a method and computer program product for interacting with a device via a heads-up display in substantially the same manners described above.

16 Claims, 13 Drawing Sheets

(51) Int. Cl.
G06K 9/00 (2006.01)
G09G 5/00 (2006.01)
G06F 3/0481 (2013.01)
G06F 3/14 (2006.01)
G06F 3/16 (2006.01)
H04L 29/08 (2006.01)
H04L 29/06 (2006.01)
H04M 1/725 (2006.01)

(52) U.S. Cl.
CPC ....... *G02B 27/017* (2013.01); *G06F 3/04817* (2013.01); *G06F 3/14* (2013.01); *G06F 3/167* (2013.01); *G06K 9/0061* (2013.01); *G09G 5/003* (2013.01); *H04L 67/06* (2013.01); *H04L 67/42* (2013.01); *H04M 1/7253* (2013.01); *G02B 2027/014* (2013.01); *G02B 2027/0187* (2013.01); *G09G 2370/022* (2013.01)

(56) References Cited

U.S. PATENT DOCUMENTS

| | | | |
|---|---|---|---|
| 2009/0300744 A1* | 12/2009 | Guo | H04L 63/0823 726/7 |
| 2012/0075168 A1* | 3/2012 | Osterhout | G02B 27/017 345/8 |
| 2012/0194549 A1 | 8/2012 | Osterhout et al. | |
| 2012/0242697 A1 | 9/2012 | Border et al. | |
| 2013/0042010 A1 | 2/2013 | Reunamaki et al. | |
| 2013/0042296 A1 | 2/2013 | Hastings et al. | |
| 2013/0081114 A1* | 3/2013 | Bell | H04L 63/0846 726/5 |
| 2013/0127980 A1 | 5/2013 | Haddick et al. | |
| 2013/0147686 A1* | 6/2013 | Clavin | G06F 3/013 345/8 |
| 2013/0246967 A1 | 9/2013 | Wheeler et al. | |
| 2013/0307771 A1 | 11/2013 | Parker et al. | |
| 2014/0091984 A1* | 4/2014 | Ashbrook | G06F 3/1462 345/2.1 |
| 2014/0160157 A1 | 6/2014 | Poulos et al. | |
| 2015/0089568 A1* | 3/2015 | Sprague | H04L 63/0876 726/1 |
| 2015/0324568 A1* | 11/2015 | Publicover | H04N 5/23229 726/19 |
| 2015/0326570 A1* | 11/2015 | Publicover | H04N 5/23229 726/4 |
| 2015/0365388 A1* | 12/2015 | Little | H04L 63/08 726/7 |
| 2016/0050204 A1* | 2/2016 | Anderson | H04L 63/0876 726/4 |

OTHER PUBLICATIONS

Anonymously; "Intelligent HUD (Heads-Up Display) for Mobile Devices"; An IP.com Prior Art Database Technical Disclosure; http://ip.com/IPCOM/000131816; Nov. 21, 2005.

Anonymously; "Process for displaying machine event/flow/vulnerability/etc data on handheld or Heads-up devices based upon multiple factors"; An IP.com Prior Art Database Technical Disclosure; http://ip.com/IPCOM/000237167; Jun. 6, 2014.

Wlkipedia, "Eye tracking"; https://en.wikipedia.org/wiki/Eye_tracking; Dec. 17, 2014.

Tobii Technology, "Eye tracking products"; http://www.tobii.com/en/eye-tracking-research/global/products/hardware/; 2013.

Brian Westover, "Hands On: Tobii PCEye Go"; pcmag.com; http://www.pcmag.com/article2/0,2817,2417685,00.asp; Apr. 11, 2013.

Angelika Jacobs, "Skype eye contact finally possible (w/ Video)";http://phys.org/news/2013-08-skype-eye-contact-video.html; Aug. 27, 2013.

Georgia Tech News Center, "Georgia Tech Creating High Tech Tools to Study Autism"; http://www.news.gatech.edu/2012/09/25/georgia-tech-creating-high-tech-tools-study-autism; Sep. 25, 2012.

Wikipedia, "Blind spot (vision)"; http://en.wikipedia.org/wiki/Blind_spot_(vision); Sep. 24, 2014.

List of IBM Patents or Patent Applications Treated as Related, Aug. 26, 2015.

PCT International Search Report and the Written Opinion of the International Searching Authority, Apr. 26, 2016, 15 pages.

* cited by examiner

INTERFACING VIA HEADS-UP DISPLAY USING EYE CONTACT

CROSS-REFERENCE TO RELATED APPLICATIONS

This application is a continuation of U.S. patent application Ser. No. 14/628,693, entitled "INTERFACING VIA HEADS-UP DISPLAY USING EYE CONTACT" and filed Feb. 23, 2015, the disclosure of which is incorporated herein by reference in its entirety.

BACKGROUND

Present invention embodiments relate to heads-up displays, and more specifically, to interacting with devices via a heads-up display based on eye contact of a heads-up display user and at least one other entity.

One approach to enabling users of heads-up display (HUD) devices to interact (e.g., transfer a file from one to another) is to use conventional email, FTP, text messaging, or USB drive transfers. However, these methods are inconvenient and slow for wearers of HUDs because they require many precise actions in an interface with which precision is difficult, due to the lack of precise input devices such as mice, keyboards, or touchscreens. Consider, for example, the difficulty of sending an email on a HUD without such precise input devices. Near field communication (NFC) techniques are potentially easier for users to activate than other conventional methods but may also inconvenience users because they require close physical proximity. For example, it would be awkward for two individuals to touch heads every time they wished to transfer files.

SUMMARY

According to embodiments of the present invention, a system for device interaction via a heads-up display determines an area of sight of a first entity employing a first heads-up display, and establishes interaction between at least one first device and the first heads-up display in response to detecting at least an impact of the determined area of sight on at least one second device. One advantage of present invention embodiments is to improve the speed and simplicity of interacting with devices for users of HUDs by reducing the number of slow or inconvenient actions compared to conventional approaches without the close proximity required by near field communication.

According to further embodiments of the present invention, the first heads-up display is coupled to the second device(s), and establishing the interaction comprises presenting an interface of the first device(s) on the first heads-up display, manipulating the presented interface based on the determined area of sight of the first entity on the second device(s) coupled to the first heads-up display and/or at least one voice command, and controlling the first device(s) based on the manipulation of the presented interface. Such embodiments provide the advantage of more easily controlling devices (e.g., a laptop, workstation, tablet, etc.) with a wearable HUD, which need not require hands to operate, in situations where having the device on hand is inconvenient, difficult, or impossible.

In some embodiments, detecting at least an impact of the determined area of sight comprises (1) detecting at an electromagnetic signal detector of a corresponding device associated with a first heads-up display electromagnetic signals transmitted from a transmitter associated with at least one of the first device(s) and/or (2) detecting at an electromagnetic signal detector of a corresponding device associated with at least one of the first device(s) electromagnetic signals transmitted from a transmitter associated with the first heads-up display.

In further embodiments, the first heads-up display includes an emitter to transmit signals along a direction of sight of the first entity and each of the first device(s) is associated with a corresponding one of the second device(s) comprising a receiver to receive the signals, and detecting at least an impact of the determined area of sight comprises detecting at the receiver associated with the first device(s) the signals transmitted from the first heads-up display.

In still further embodiments, the first heads-up display further includes an image capture device, and determining an area of sight comprises tracking the area of sight of the first entity via the image capture device and aiming the emitter to transmit the signals in the direction of the tracked area of sight.

In still further embodiments, the first device includes a second heads-up display employed by a second entity, and the at least one second device includes a common device impacted by determined areas of sight of the first entity and the second entity.

Embodiments of the present invention further include a method and computer program product for interacting with a device via a heads-up display in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
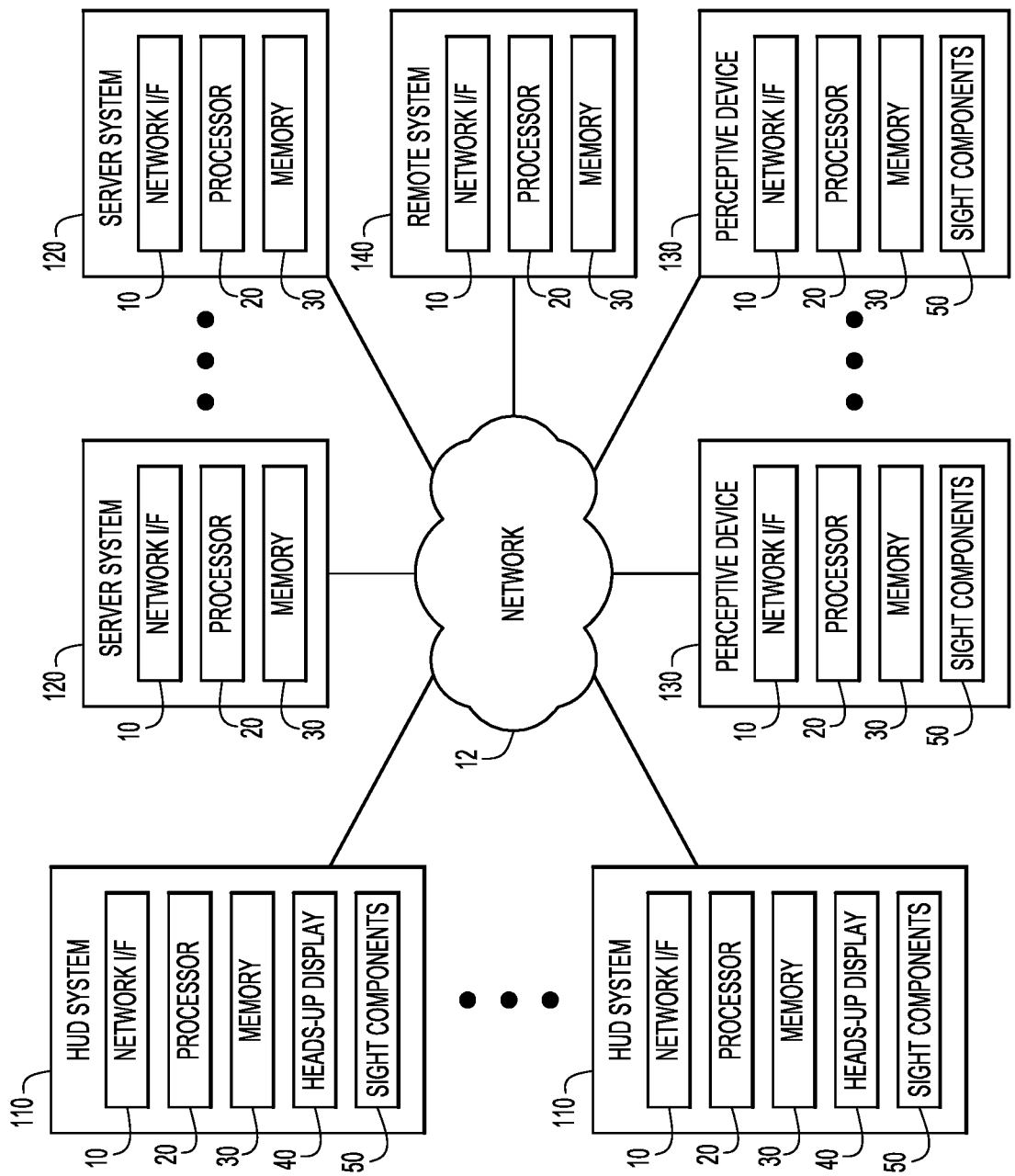
FIG. 1 is a diagrammatic illustration of an example environment for an embodiment of the present invention.

Present invention embodiments provide techniques for interacting with devices via a heads-up display (HUD) based on eye contact of the HUD user and at least one other individual or device. For example, to transfer files from one HUD device to another, a wearer of one HUD device indicates a desire to send a file; a wearer of another HUD device indicates a desire to receive the file; eye contact is made between the wearers; and the file transfer process begins as a result. A HUD device may interact with one or more other HUD devices in a one-to-one or one-to-many relationship directly or via one or more intermediate devices. In one scenario, a first HUD user may interact with a second HUD user who is remote from the first (e.g., in another city) by making eye contact with (e.g., looking at) a local device (e.g., a device in the same room) that has a remote network connection to the HUD of the second user. In addition, a HUD may interact via eye contact with a device other than a HUD. For example, a HUD wearer may initiate interaction with a device by looking at a sensor on the device. Furthermore, a HUD wearer may interact with a device (e.g., a laptop, tablet, or etc.) having a point-and-click interface presented on the HUD using the HUD wearer's gaze to direct a cursor.

Examples of interacting with devices via a HUD include the following relationships between a HUD (e.g., a wearable HUD) and a device: file transfer, initiating a connection for audio communication (e.g. a cell phone, internet call, or the like between HUDs containing a microphone and speaker), device control (e.g., the HUD controls a device, or a device controls the HUD), viewing device status, viewing a public message (e.g., a "billboard") associated with device, client-server relationships (where a wearable HUD may either be client or server), login/authentication (e.g., via a stored key, biometrics (e.g. iris patterns), etc.), and the like.

A device may detect eye contact from a HUD user or wearer actively or passively. For example, the device may include a camera and may actively analyze image data from the camera to determine that an individual is looking at the device. Alternatively, a device may detect eye contact from a HUD wearer passively. For example, the device may receive a focused signal from the HUD indicating that the wearer of the HUD is looking at the device.

One advantage of a present invention embodiment is to improve the speed and simplicity of interacting with devices for users of HUDs compared to conventional approaches. For example, file transfer via a HUD using email requires many actions to be taken in the user interface (UI) presented by the HUD for both the sender and receiver: the sender and/or receiver must take actions to specify the receiver address, access and log into the mail client, select the attachment to download, etc. An embodiment of the present invention simplifies the interaction. File transfers may be performed hands free, and may therefore take place even when users are busy with other tasks.

Alternative approaches using near field communication (NFC) techniques (e.g., "bumps" used to exchange information between phones) require both users to have a device with NFC capability, have those devices on them at the time, and have time and unoccupied hands to use the devices. Furthermore, use of NFC techniques with wearable HUDs would require the wearers to bump two HUD devices (e.g., pairs of glasses) together, which is awkward and non-intuitive. Present invention embodiments provide an intuitive, hands free, faster, and convenient mode of interacting via wearable HUDs.

An example environment for present invention embodiments is illustrated in FIG. 1. Specifically, the environment may include one or more heads-up display (HUD) systems 110, one or more server systems 120, one or more perceptive devices 130, and one or more remote systems 140. HUD systems 110, server systems 120, perceptive devices 130, and remote systems 140 may communicate over a network 12. Network 12 may be implemented by any number of any suitable communications media (e.g., wide area network (WAN), local area network (LAN), Internet, intranet, hardwire, wireless link, etc.).

A HUD system 110 comprises heads-up display 40 and may be in the form of headgear (e.g., head-mounted display, helmet-mounted display, glasses, etc.), other wearable device (e.g., contact lenses, clothing, etc.), or other configuration having an interactive user-interface. HUD system 110 and/or perceptive device 130 may comprise sight components 50 for establishing eye contact between individuals and/or devices. Sight components 50 may reside within, on, and/or proximate to HUD system 110. Alternatively, the sight components may be remote from an associated HUD system and communicate with the HUD system, e.g., via network 12. In addition, any number of perceptive devices 130 may include sight components 50. HUD system 110 may present any graphical user (e.g., GUI, etc.) or other interface (e.g., control buttons, touch sensors, visual sensors, accelerometers, microphone and voice command interface, etc.) to receive commands from and display information to users. Perceptive devices 130 typically lack an integrated display and are not worn by a user, but may include a display and/or be worn by a user.

HUD system 110, server systems 120, perceptive devices 130, and remote systems 140 may include at least one processor 20, memories 30, and/or internal or external network interface or communications devices 10 (e.g., modem, network cards, Wi-Fi, wireless (e.g., 3G, 4G, etc.), etc.) and any commercially available and custom software (e.g., user interface software, network software, server software, etc.). Server systems 120 preferably are equipped with a display or monitor and optional input devices (e.g., a keyboard, mouse, or other input device), The HUD systems, server systems, perceptive devices, and/or remote systems may include one or more modules or units (e.g., line of sight module, analysis module, signal module, etc.) to perform the various functions of present invention embodiments described below (e.g., tracking the direction of a wearer's gaze, detecting eye contact from another, sending and receiving infra-red or other signals, etc.), may be implemented by any combination of any quantity of software and/or hardware modules or units, and may reside within memory 30 of a HUD system, server system, perceptive device, remote system, or other systems (e.g., sight components 50) for execution by processor 20.

Figure 2:
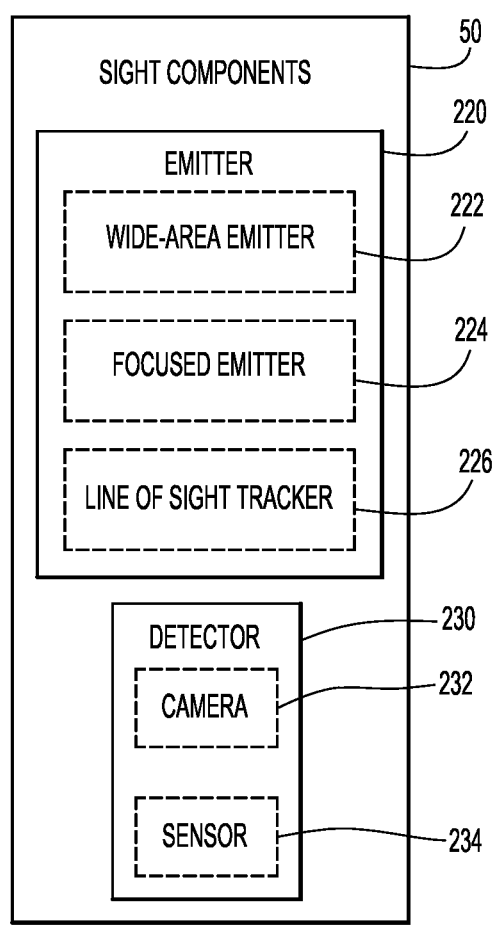
FIG. 2 is a block diagram of example sight components for eye-contact according to an embodiment of the present invention.

Example sight components 50 according to an embodiment of the present invention are illustrated in FIG. 2. In particular, sight components 50 comprise emitter 220 and detector 230 for sending and receiving signals, respectively, to other devices (e.g., devices within a line of sight, cone of sight, area of sight, or field of view of a HUD system or user). Sight components 50 may further comprise line of sight tracker 226. Emitter 220 may include a wide-area emitter 222 and/or focused emitter 224, which may operate in conjunction with line of sight tracker 226.

Wide-area emitter 222 may be implemented by a conventional or other electromagnetic (EM) emitter 222 (e.g., an infra-red light source) and may emit EM signals into any area or field (e.g., conical, omnidirectional, etc.). Focused emitter 224 may be a focused, collimated, or other narrow, directed electromagnetic (e.g., infra-red) source (e.g., a laser, an optically collimated source, etc.). Sensor 234 may be implemented by a camera or a conventional or other photodetector. Detector 230 detects signals impinging on the detector, e.g., from an emitter 220 of another HUD. Detector 230 may be implemented using camera 232 and/or sensor 234 (e.g., a conventional or other photodetector).

According to one embodiment of the present invention, a HUD system 110 or perceptive device 130 comprising camera 232 includes an analysis module that operates with the camera to detect individuals making eye contact with the system or the system's wearer. For example, the analysis module may determine that the camera is within the line of sight, area of sight, or field of view of the individual. Conventional or other pattern recognition techniques for detecting a person's line or area of sight from camera image data may be used to implement the analysis module. In addition, camera 232 may be used to receive signals from emitter 220 of another HUD system 110 or other perceptive device 130. A signal module receives and decodes signals from the camera and encodes and sends signals via the emitter. According to this embodiment, the other system may use a non-focused emitter and need not (but may) include a focused emitter or line of sight tracker.

According to another embodiment of the present invention, a HUD system 110 comprises a focused emitter 224 and line of sight tracker 226. Line of sight tracker 226 and focused emitter 224 are typically mounted on a HUD worn by the user. Line of sight tracker 226 monitors the direction in which the wearer of the HUD is looking. A line of sight module receives information from line of sight tracker 226 about the direction in which the wearer is looking and maneuvers focused emitter 224 to point in the same direction. When the user looks at another HUD system 110 or other perceptive device 130, the other system may detect (e.g., via sensor 234) a signal from the focused emitter, and thereby determine that the wearer is looking at the device. According to this embodiment, the other system need not (but may) include an outward facing camera 232.

Line of sight tracker 226 may be implemented using known techniques. For example, the line of sight tracker may comprise one or more cameras looking toward the wearer's eyes. The line of sight module may analyze the camera data to determine the direction of the wearer's gaze using known techniques. Alternatively, or in addition, line of sight tracker 226 may use contact lenses to assist in determining the direction of the user's gaze.

Figure 3:
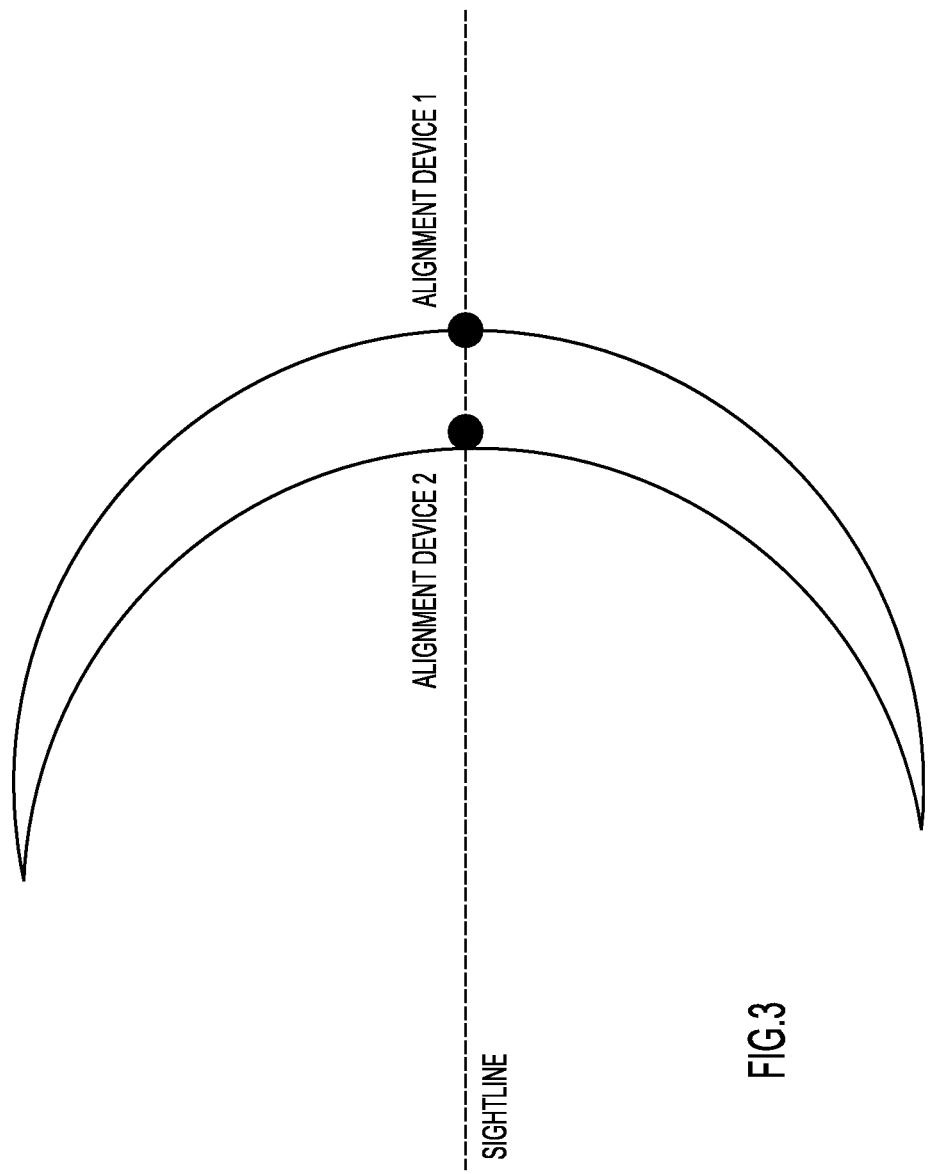
FIG. 3 is a schematic diagram of an example contact lens to facilitate line of sight tracking according to an embodiment of the present invention.

An example contact lens to facilitate line of sight tracking according to an embodiment of the present invention is illustrated in FIG. 3. Since a line is defined by two points in space, a tiny device may be placed at each of two points on a contact lens: e.g., alignment device 2 may be placed near the interior surface of the lens at the center, and alignment device 1 may be placed near the exterior surface of the lens at the center. Line of sight tracker 226 detects the line defined by these two points, and aims the focused emitter along that line. These devices may be placed at the blind spot in the middle of the eye (the punctum caecum).

Figure 4:
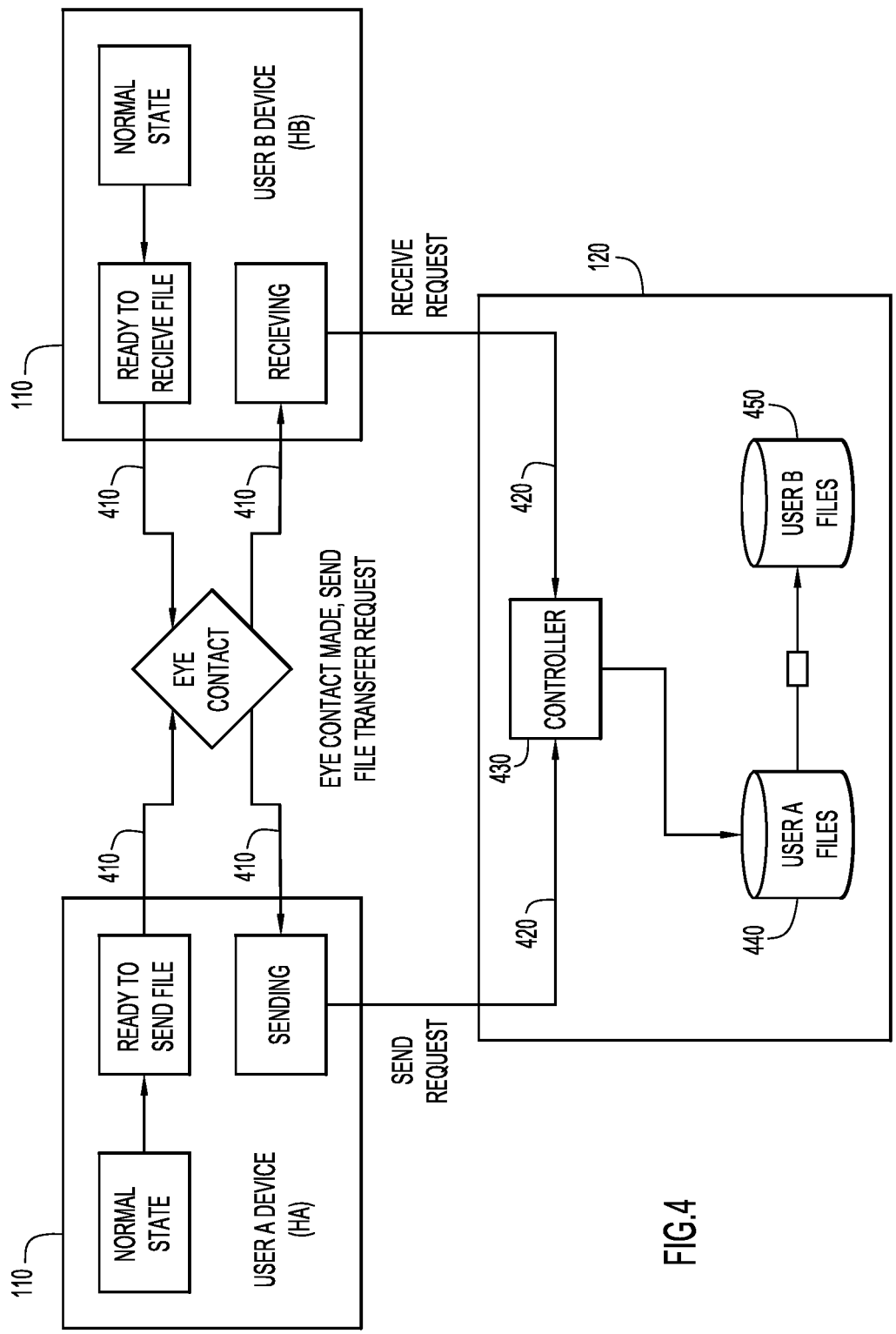
FIG. 4 is a block diagram of two heads-up display systems interacting according to an embodiment of the present invention.
Figure 5:
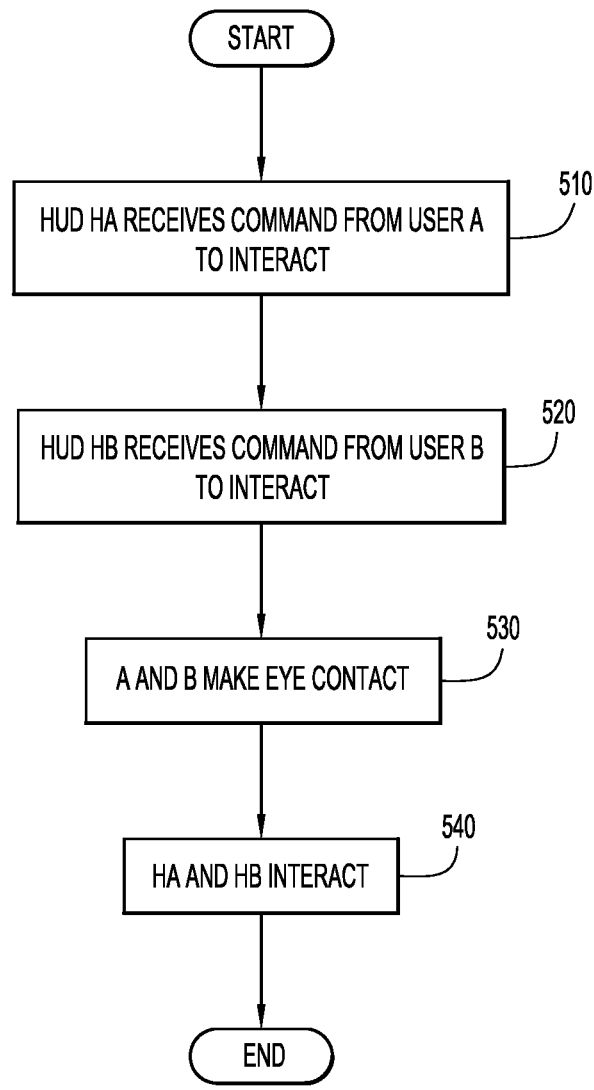
FIG. 5 is a flow diagram illustrating an example manner in which two heads-up display systems may interact according to an embodiment of the present invention.

An example manner in which two HUD systems 110 may interact according to an embodiment of the present invention is illustrated in FIGS. 4 and 5. One HUD system 110 (denoted HA) is worn by user A, and a second HUD system 110 (denoted HB) is worn by user B. Users A and B are visible to each other, and are close enough for each of their HUD systems to detect eye contact from the other user. Users A and B may interact via HA and HB, respectively. For example, user A may use HA to select files to transfer. These files may, e.g., reside locally to HA or remotely (e.g., in storage 440 for user A on server system 120). User B may use HB to view files, which may reside, e.g., locally to HB or remotely (e.g., in storage 450 for user B on the server system). User A wants to send a file to user B, and user B wants to receive the file from user A.

At step 510, user A sends a command to HA (e.g., by voice or otherwise) to initiate an interaction. For example, user A may send a command to HA to transfer a selected file. At step 520, user B sends a command to HB (e.g., by voice or otherwise) to initiate a transaction. For example, user B may send a command to HB to receive a file. At step 530, eye contact between A and B is established. In the course of establishing eye contact, HA and HB may exchange signals 410, and HA may obtain a unique identifier of HB. Likewise, HB may obtain a unique identifier of HA. The unique identifier of a HUD 110 or perceptive device 130 may be used to determine an address for communicating with HUD or perceptive device. For example, the unique address may be used to look up (or may be) an IP address or domain name.

As a result of HA and HB having received commands to initiate the interaction and establishing eye contact, the interaction is initiated at step 540. Once initiated, the interaction may proceed in a conventional or other manner. For example, HA may establish a TCP connection or otherwise communicate with HB via network interfaces devices 10 and network 12 using the unique identifier for HB obtained at step 530. Alternatively, HA and HB may establish a network connection or otherwise transfer further information via emitters 220 and detectors 230. In the example illustrated in FIG. 4, HA may send the selected file, or an identifier of the selected file, to a controller module 430 of server system 120, which transfers the file from user A's storage 440 to user B's storage 450. HB polls the server system and retrieves the file (e.g. via a FTP, POP/IMAP, etc.). User B may then view the file from HUD HB.

Figure 6:
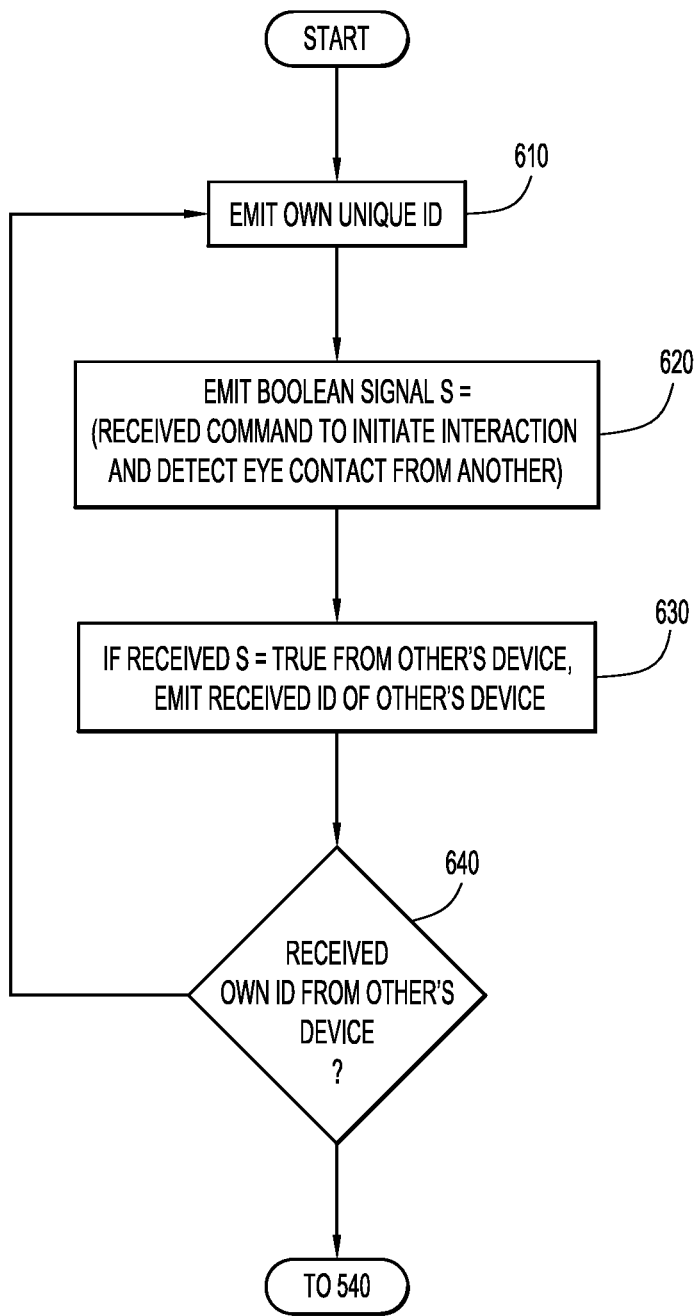
FIG. 6 is a flow diagram illustrating an example manner of establishing eye contact between wearers of two heads-up display systems according to an embodiment of the present invention.

An example manner of establishing eye contact between wearers of two heads-up display (HUD) systems according to an embodiment of the present invention is illustrated in FIG. 6. Each of the HUD systems performs eye contact detection (e.g., actively by analyzing images of camera 232 or passively by receiving signals from a focused emitter 224), receives and decodes emitted signals, and performs the following steps. The HUD system emits a unique identifier (e.g., by flashing its emitter 220) at step 610. At step 620, the HUD system emits a Boolean signal S (via emitter 220) that indicates whether the following conditions are true: the HUD system has received a command to initiate interaction (e.g., send a selected file, receive a file, etc.) and the HUD system detects eye contact from the wearer of another HUD system. If the HUD system has received a Boolean signal S with a value of true from another system, the HUD system emits the unique identifier of the other system at step 630. At step 640, the HUD system determines whether it has received its own unique identifier from the other HUD system. If so, processing proceeds to step 540 (FIG. 5) and interaction between the HUD systems is initiated. Otherwise, processing returns to step 610.

Accordingly, HA emits three signals via its emitter 220: (1) a unique identifier for HA; (2) a Boolean signal to indicate whether HA detects eye contact and A has given a command to initiate interfacing (e.g., send a file); and (3), only if HB signals to HA that it is open to initiate interfacing (e.g., B has given a command to receive a file), the unique identifier of the HUD whose user has established eye contact with HA. The third signal prevents ambiguous signaling in case multiple devices detect eye contact by indicating that signals 1 and 2 are intended only for HB. Similarly, HB emits three signals via its emitter 220: (1) a unique identifier for HB; (2) a Boolean signal to indicate whether HB detects eye contact and HB is open to interfacing; and (3), only if HA signals to HB that it is open to initiate interfacing, the unique identifier of the HUD whose user has established eye contact with HB. The third signal prevents ambiguous signaling in case multiple devices detect eye contact by indicating that signals 1 and 2 are intended only for HA. When A looks at B, the HUD worn by A sees HB's unique identifier and, from that unique identifier, can identify an address with which it can interface with HB. Furthermore, as a precondition for interfacing, when A looks at B, HA has to see that HB's Boolean signal (indicating that HB both detects eye contact, and that HB is open to interfacing) is set to "True". Once that precondition is met, HA and HB establish a connection interaction (e.g. via network 12) directly to each other or to one or more servers mediating the interaction. HA and HB may then interact via the connection.

Figure 7:
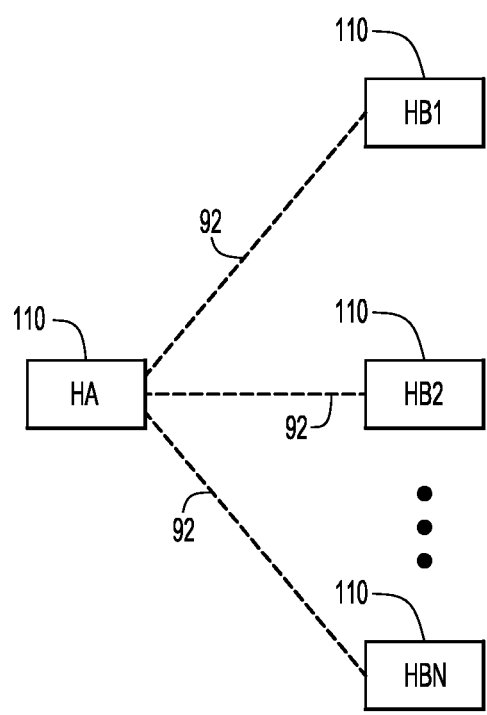
FIG. 7 is a block diagram of a heads-up display system interacting with other heads-up display systems in a one-to-many relationship according to an embodiment of the present invention.
Figure 8:
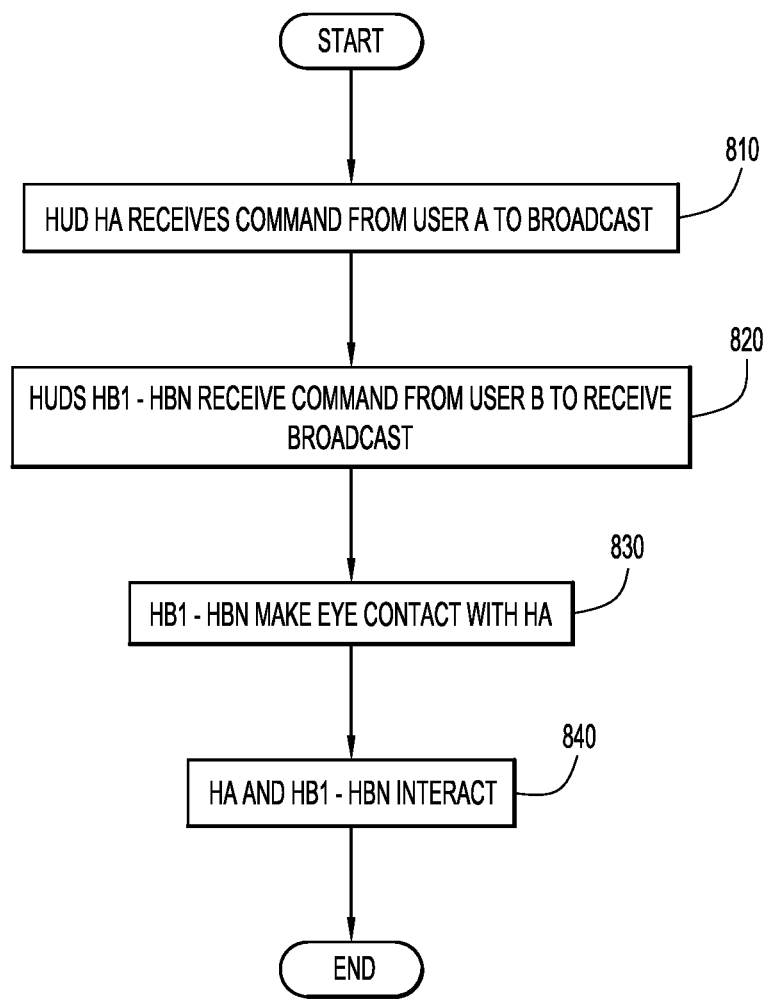
FIG. 8 is a flow diagram illustrating an example manner in which a heads-up display system may interact with other heads-up display systems in a one-to-many relationship according to an embodiment of the present invention.

An example manner in which a HUD system 110 may interact with other HUD systems 110 in a one-to-many relationship according to an embodiment of the present invention is illustrated in FIGS. 7 and 8. One HUD system 110 (denoted HA) is worn by user A, and one or more other HUD systems 110 (e.g., HB1, HB2, ... HBN) are worn by corresponding other users (e.g., B1, B2, ... BN). User A is visible to users B1-BN (via lines of sight 92), and is close enough for each of HB1-HBN to detect signals from HA. HA may interact with HB1-HBN in a one-to-many manner. For example, user A may want to transfer a file to a large group of people wearing HUD systems within visual range. User A may select a file, and enter a "file broadcast" mode to transfer a file to all those who make eye contact with HA.

In particular, at step 810, user A sends a command to HA (e.g., by voice or otherwise) to initiate an interaction in broadcast mode. At step 820, each user B1-BN sends a command to his or her HUD system (e.g., by voice or otherwise) to initiate a transaction as a broadcast receiver. At step 830, eye contact is established between HA and each of HB1-HBN. For example, eye contact may be established between user A and each of users B1-BN in the manner described with respect to FIG. 6. Alternatively, HA may emit its unique identifier (e.g., via non-focused emitter 222) and a signal indicating its broadcast mode in response to the command from HA; eye contact is then established by HB1-HBN detecting the unique identifier and signal from HA.

As a result of HA and HB1-HBN receiving the commands and establishing eye contact, the interaction is initiated at step 840. Once initiated, the interaction may proceed in a conventional or other manner. For example, HA may send (e.g., via network 12) a file or other data to a server, and HB1-HBN may request the file or other data from the server (e.g., via network 12) using the unique identifier for HA obtained at step 830.

Figure 9:
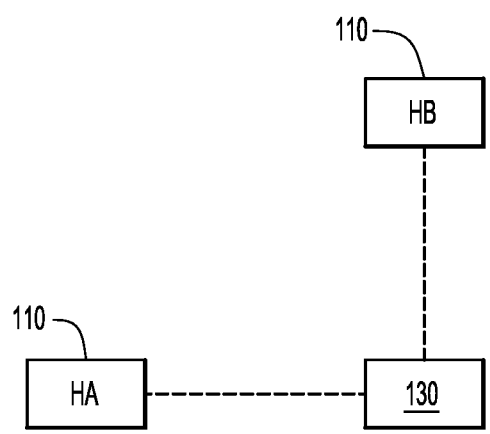
FIG. 9 is a block diagram of heads-up-display systems interacting via an intermediate perceptive device using eye contact according to an embodiment of the present invention.

An example manner in which HUD systems 110 may interact using an intermediate perceptive device 130 according to an embodiment of the present invention is illustrated in FIG. 9. One HUD system 110 (denoted HA) is worn by user A, and a second HUD system 110 (denoted HB) is worn by user B. A perceptive device 130 (device D) is visible to both users and is close enough for device D to detect eye contact from the users. Users A and B need not be visible to one another. Users A and B may interact (e.g., transfer a file) using eye contact with device D. The interaction may otherwise proceed, e.g., in a manner similar to that described with respect to FIG. 5.

In another example scenario in which HUD users interact using an intermediate perceptive device, the HUD users may have two privileges with respect to device D: a read-only relationship and a read-write relationship. Device D may be associated with one and only one file at any given time. If user A has read-write privileges with device D and wants to send a file to one or more other HUD users (e.g., a large group of people), user A may make eye contact with device D to send the file to device D. The other HUD users that have read or read-write privileges with device D may look at device D to download the file, rather than having to make eye contact with HA, which may not have the hardware or software necessary to handle a large number of simultaneous incoming and outgoing connections.

Figure 10:
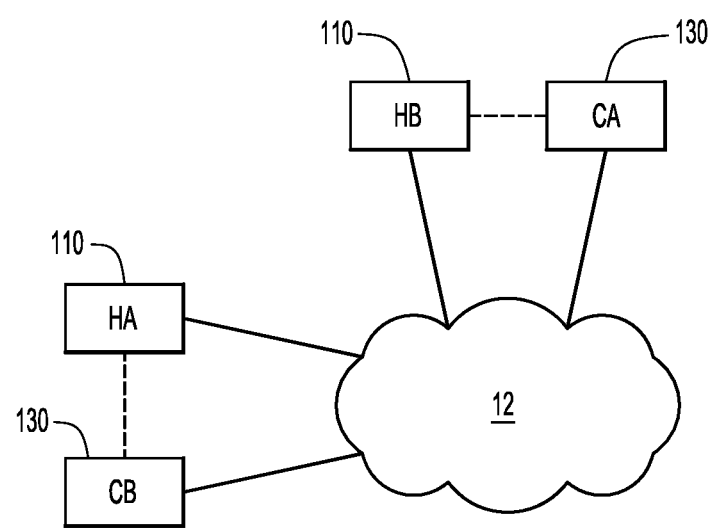
FIG. 10 is a block diagram of heads-up-display systems interacting via a plurality of networked intermediate perceptive devices using eye contact according to an embodiment of the present invention.

An example manner in which HUD systems 110 may interact using a plurality of intermediate perceptive devices 130 according to an embodiment of the present invention is illustrated in FIG. 10. One HUD system 110 (denoted HA) is worn by user A, and a second HUD system 110 (denoted HB) is worn by user B. A perceptive device (CA) is visible to user B and is close enough for CA to detect eye contact from user B. A perceptive device (CB) is visible to user A and is close enough for CB to detect eye contact from user A. CA has a connection to HA (e.g., via network 12), and CB has a connection to HB (e.g., via network 12). Users A and B need not be visible to one another and may be far removed from one another. Users A and B may interact (e.g., transfer a file) using eye contact with CB and CA, respectively, in a manner similar to that described with respect to FIG. 5. For example, user A may use HA to select a file (e.g., on local storage, on a server, etc.) to transfer and send HA a command (e.g., by voice, touch, gesture, etc.) to transfer a file to user B. User B sends HB a command (e.g., by voice, touch, gesture, etc.) to receive a file from A. In response to CB detecting eye contact with A contemporaneously with CA detecting eye contact with B, a direct or indirect connection between HA and HB may be created (e.g., via network 12) by which HA sends the file to HB. According to one embodiment of the present invention, CA or CB may, e.g., be implemented as a webcam on a laptop.

Figure 11:
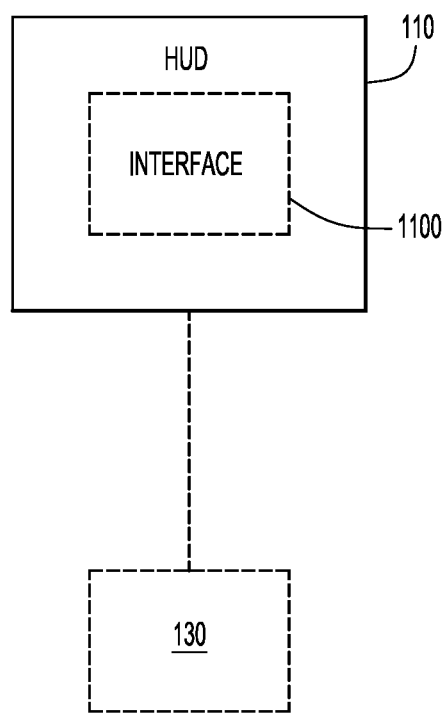
FIG. 11 is a block diagram of a heads-up-display system interacting in a one-to-one relationship with a perceptive device using eye contact according to an embodiment of the present invention.

An example manner in which a HUD system 110 may interact with a device (e.g., a perceptive device 130) using eye contact according to an embodiment of the present invention is illustrated in FIG. 11. When a HUD system user makes eye contact with the detector 220 of the device, an interface 1100 for the device is displayed on the user's HUD system. By way of example, consider a technician wearing a HUD system 110 who enters a room full of generators, and needs to find which of the generators is broken. A perceptive device 130 resides on each generator. The location of the detector 230 of perceptive device 130 on an object (e.g., a generator) may be established by convention (e.g. "the sensor is always in the top-right corner of the object"), or the location could be indicated by markings on the object (e.g. a bulls eye showing where the sensor is) so that a HUD system users may determine where to look to interact with the device. When the technician makes eye contact with the appropriate location on each generator, a popup interface 1100 on the technician's HUD displays the generator's state, e.g. how much electricity it is generating. Accordingly, the HUD provides the technician an indication of which generator is broken.

In addition, non-HUD devices having a perceptive device 130 may provide an interactive interface to the wearer of a HUD that looks at the perceptive device. For example, while a wearer of a HUD walks down a street, devices that may be interacted with via eye contact may be indicated or tagged with small icons on the HUD. If the wearer looks directly at these icons (i.e. directly at the device), the icons may, e.g., expand, and bring up information about the device, and actions one may take to interact with the device. For example, such a device may be placed on the exterior facade of a restaurant. This device may be tagged with a tiny icon in users HUDs. If a HUD wearer makes eye contact with the device (e.g., by looking directly at the icon in the interface), the icon may expand and show the HUD wearer information (e.g., how many open seats the restaurant had, how long the wait was, the menu, etc.). The HUD wearer may perform actions with the device (e.g., place an order or place a reservation from this restaurant interface).

Figure 12:
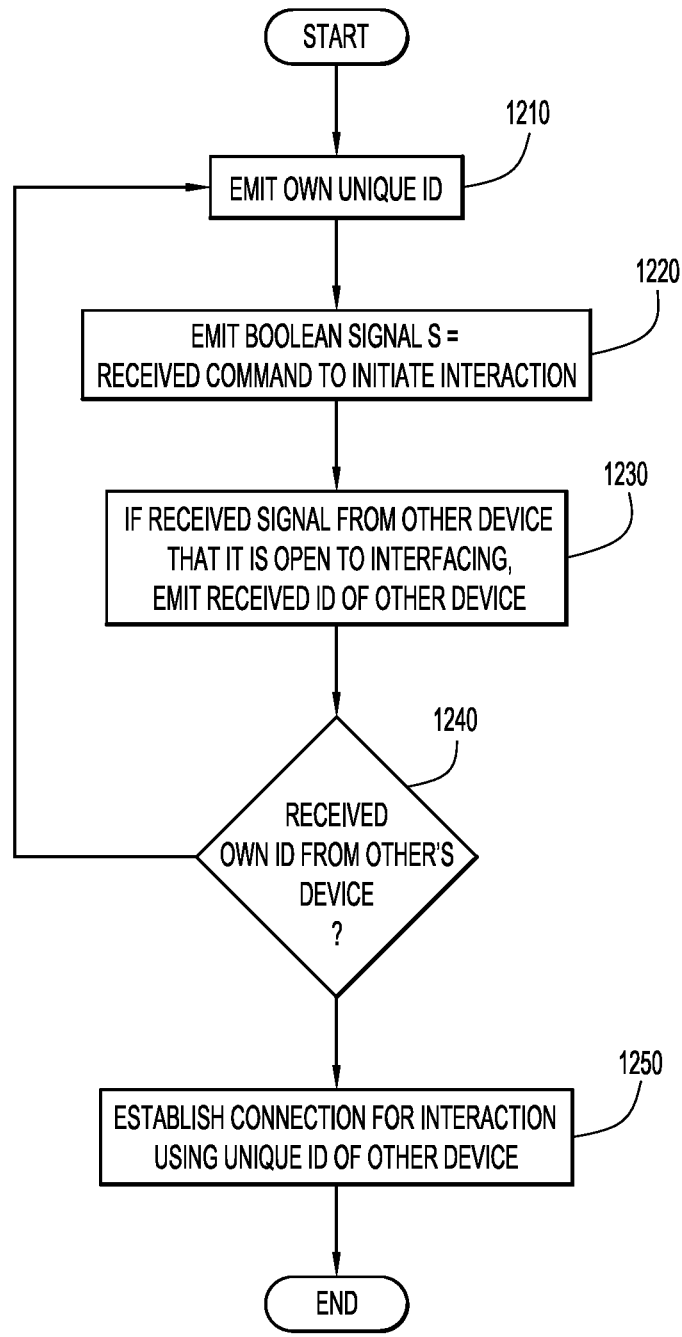
FIG. 12 is a flow diagram illustrating an example manner of establishing eye contact between a heads-up-display system and a perceptive device using camera-based eye contact according to an embodiment of the present invention.
Figure 13:
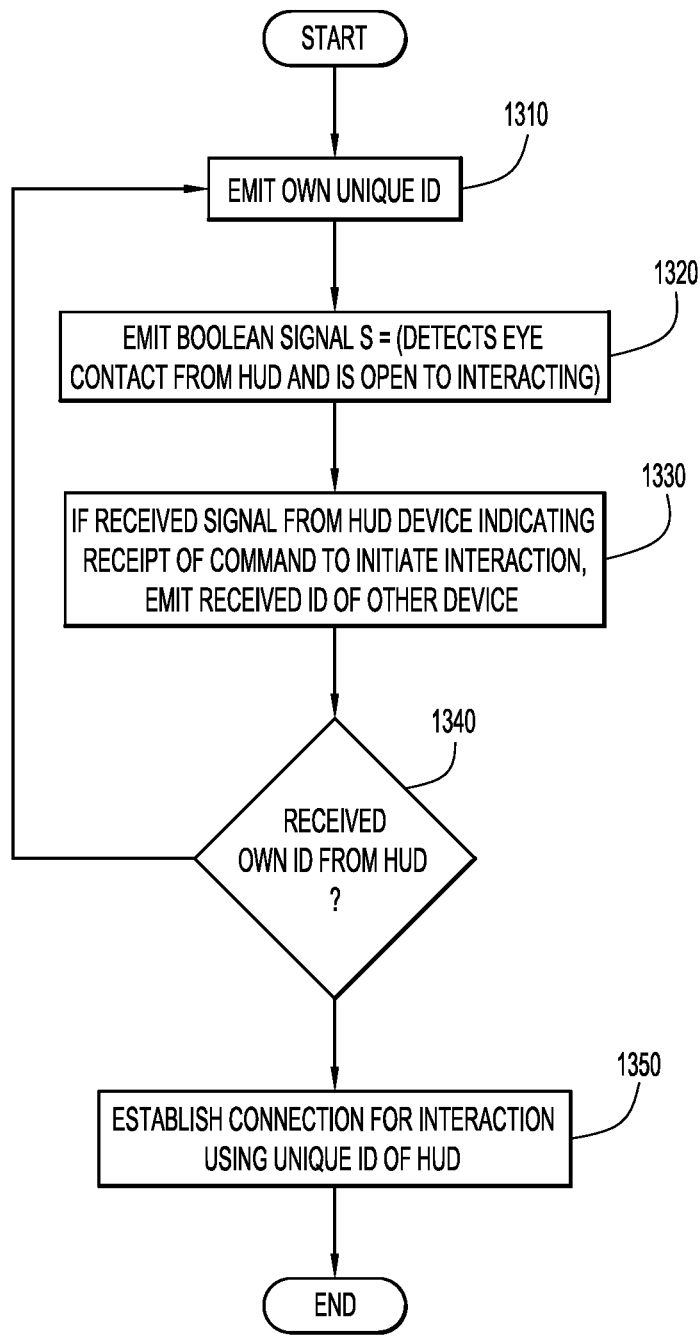
FIG. 13 is a flow diagram illustrating an example manner of establishing eye contact between a heads-up-display system and a perceptive device using focused-emitter-based eye contact according to an embodiment of the present invention.

An example manner of establishing eye contact between a heads-up-display system 110 and a perceptive device 130 (device D) using camera-based eye contact according to an embodiment of the present invention is illustrated in FIGS. 12 and 13. The HUD system includes a camera 232, and device D includes a camera 232 and an analysis module that operates with the camera to detect individuals making eye contact with the camera 232 of device D. Device D performs eye contact detection by analyzing images of camera 232. The HUD system and device D each receive and decode signals from an emitter 220 of the other.

The HUD system performs the following steps. At step 1210, the HUD system emits a unique identifier (e.g., by flashing its emitter 220). At step 1220, the HUD system emits a Boolean signal S (via emitter 220) that indicates whether the HUD system has received a command to initiate interaction (e.g., send a selected file, receive a file, etc.). If the HUD system has received a Boolean signal S from device D indicating that device D is open to interacting, the HUD system emits the unique identifier of device D at step 1230. At step 1240, the HUD system determines whether it has received its own unique identifier from device D system. If so, the HUD system initiates the interaction using the unique identifier of device D at step 1250 (e.g., by establishing a TCP connection to device D via network 12 sending device D a file). Otherwise, the HUD system returns to step 1210.

Device D performs the following steps. At step 1310, device D emits a unique identifier (e.g., by flashing its emitter 220). At step 1320, the device D emits a Boolean signal S (via emitter 220) that indicates whether the following condition is true: device D detects eye contact from a HUD system user, and device D is open to interacting. If device D has received a Boolean signal S from the HUD system indicating that the HUD system has received a command to initiate interaction, device D emits the unique identifier of the HUD system at step 1330. At step 1340, device D determines whether it has received its own unique identifier from the HUD system. If so, device D initiates interaction using the unique identifier of the HUD system at step 1350 (e.g., by establishing a TCP connection to the HUD via network 12 and receiving a file). Otherwise, device D returns to step 1310.

According to an alternative embodiment of the present invention a heads-up-display system 110 includes a focused emitter 224 and line of sight tracker 226 and interacts with an perceptive device 130 (device D) in the following manner. Line of sight tracker 226 tracks the eye movements of a wearer of the HUD system and directs the focused emitter to point in the direction the wearer looks. Detector 230 of device D (e.g., sensor 234) receives signals from the HUD system's focused emitter. The HUD system and device D each receive and decode signals from the emitter of the other. To establish eye contact between the HUD system and device D, the HUD system emits two signals via the focused emitter: (1) a unique identifier of the HUD and (2) a Boolean signal to indicate whether the HUD system has received the command to initiate interaction. When the wearer of the HUD system looks at device D, device D receives the signals from the HUD systems focused emitter. From these signals, device D determines the HUD system's unique identifier and, if device D is open to interaction, device D initiates interaction using the unique identifier of the HUD system (e.g., by establishing a TCP connection to the HUD system via network 12 and receiving a file).

According to another embodiment of the present invention, devices that include a perceptive device 130 or other devices (e.g., remote systems 140) may present an interface to a user via a HUD system 110. For example a wearer of a HUD system 110 may interact with a device (e.g., a tablet, laptop, etc.) not on hand (e.g. a device that is remote, inaccessible, in one's backpack, in another room, etc.). That device has a user interface (UI) associated with it, such as the UI displayed on a screen of the device, or a UI stored in the HUD system. The HUD wearer may display the UI of the device on the HUD to control the device via this UI using a data connection between the HUD system and the device (e.g., a TCP connection over network 12). The connection may be established via eye contact between the device and the wearable HUD system or otherwise.

According to one embodiment, the UI as shown in the wearable HUD may be a close or exact copy of the UI as it appears on the conventional display of the device. Alternatively, the UI may be translated or modified between the device and the HUD to better suit the UI of a wearable HUD.

Providing a user interface to other devices via a HUD (which may require no hands or minimal hand use to operate) enables easier control of another device in situations where having the device on hand is inconvenient, difficult, or impossible. Control of a device such as a laptop via a HUD, may be less efficient than using a mouse and keyboard in some circumstances, but may be more convenient if the device is far away or otherwise difficult or unfeasible to access directly (e.g., while standing in a crowded subway train, walking, etc.).

Devices that may provide a user interface via a HUD system 110 may include devices with screens (such as smartphones, laptops, etc.) and devices without screens. A device without a screen may display a HUD-specific UI to HUD systems that connect to it. For example, for headless devices, the HUD system may define the UI that is used to interact with the device.

For devices that provide a point-and-click or touch interface (e.g., a desktop/laptop computer interface, touchpad/smartphone interface, etc.) that may be presented to a user via a HUD system comprising a line of sight tracker 226, the HUD user may use his or her eyes to direct a cursor of the UI of this device and perform actions via the cursor (e.g. left/right clicking, "tapping" (i.e., simulating a finger making contact with a touchscreen), etc.) using, e.g., voice commands. In this manner, the HUD interface allows finer control of the device than voice or other commands alone.

It will be appreciated that the embodiments described above and illustrated in the drawings represent only a few of the many ways of implementing embodiments for interacting with devices via a heads-up display (HUD) using eye contact.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of device interaction via a heads-up display comprising:
   exchanging signals at a first heads-up display of a first entity with a second heads-up display of a second entity, wherein the first and second heads-up displays are members of a group of at least three heads-up displays, and exchanging the signals comprises:
   exchanging a signal at the first heads-up display with the second heads-up display, wherein the signal for each of the first and second heads-up displays indicates a plurality of conditions including receipt of a command for an interaction between the first and second heads-up displays and detection of an area of sight of a corresponding entity provided by each of the first and second heads-up displays of the group; and
   in response to receiving the signal at the first heads-up display, transmitting from the first heads up display to the second heads-up display a unique identifier for the first heads-up display and receiving at the first heads-up display from the second heads-up display a unique identifier for the second heads-up display; and
   establishing the interaction specified by the command between the first heads-up display and at least one first device including the second heads-up display, wherein the interaction between the first and second heads-up displays is established in response to receiving at the first head-up display from the second heads up display the unique identifier for the first heads-up display and receiving at the second heads-up display from the first heads-up display the unique identifier for the second heads-up display.

2. The method of claim 1, wherein the area of sight includes one of a line of sight and a cone of sight.

3. The method of claim 1, wherein the interaction between the at least one first device and the first heads-up display includes one or more from a group of: controlling one or more from a group of the at least one first device and the first heads-up display, viewing a status of one or more from a group of the at least one first device and the first heads-up display, viewing a message associated with one or more from a group of the at least one first device and the first heads-up display, a server-client relationship between the at least one first device and the first heads-up display, transferring a file between the at least one first device and the first heads-up display, initiating a connection for audio communication between the at least one first device and the first heads-up display, and authentication of the first entity to one or more from a group of the at least one first device and the first heads-up display.

4. The method of claim 1, wherein the first heads-up display is coupled to at least one second device, and establishing the interaction comprises:
   presenting an interface of the at least one first device on the first heads-up display;
   manipulating the presented interface based on one or more from a group of the area of sight of the first entity on the at least one second device coupled to the first heads-up display and at least one voice command; and
   controlling the at least one first device based on the manipulation of the presented interface.

5. The method of claim 1, wherein the at least one first device further includes a processing device.

6. The method of claim 5, further comprising one or more from a group of:
   detecting at an electromagnetic signal detector of a corresponding one of at least one second device associated with the first heads-up display electromagnetic signals transmitted from a transmitter associated with the at least one first device; and
   detecting at an electromagnetic signal detector of a corresponding one of at least one second device associated with the at least one first device electromagnetic signals transmitted from a transmitter associated with the first heads-up display.

7. The method of claim 6, wherein the transmitted electromagnetic signals associated with the at least one first device and the first heads-up display each include information to establish the interaction between the at least one first device and the first heads-up display.

8. The method of claim 5, wherein the first heads-up display includes an emitter to transmit signals along a direction of sight of the first entity and each of the at least one first device is associated with a corresponding second device comprising a receiver to receive the signals, and the method further comprises:
   detecting at the receiver associated with the at least one first device the signals transmitted from the first heads-up display.

9. The method of claim 8, wherein the first heads-up display further includes an image capture device, and the method further comprises determining an area of sight of the first entity by:
   tracking the area of sight of the first entity via the image capture device; and
   aiming the emitter to transmit the signals in the direction of the tracked area of sight.

10. The method of claim 8, wherein the first entity employs a contact lens with a plurality of objects defining the area of sight, and the method further comprises determining an area of sight of the first entity by:
    ascertaining the area of sight defined by the plurality of objects; and
    aiming the emitter to transmit the signals in the direction of the ascertained area of sight.

11. The method of claim 1, wherein the method further comprises one or more from a group of:
    detecting at a receiver of a corresponding one of at least one second device associated with the first heads-up display signals transmitted by an emitter from the second heads-up display along a direction of sight of the second entity; and
    detecting at a receiver of a corresponding one of at least one second device associated with the second heads-up display signals transmitted by an emitter from the first heads-up display along a direction of sight of the first entity.

12. The method of claim 1, wherein a plurality of first entities each employ a corresponding first heads-up display, and the second heads-up display includes at least one second device, and wherein the method further comprises:
    determining an area of sight of each first entity employing a corresponding one of the first heads-up displays;
    wherein establishing the interaction further comprises:
    establishing interaction between the second heads-up display and each first heads-up display in response to detecting the area of sight of a first entity of that first heads-up display on the at least one second device of the second heads-up display.

13. The method of claim 1, wherein a common device is impacted by areas of sight of the first entity and the second entity.

14. The method of claim 1, wherein an initial device is impacted by the area of sight of the first entity and another different device, remote from the initial device, is impacted by the area of sight of a third entity of a third heads-up display to establish interaction between the first and third heads-up displays.

15. The method of claim 1, wherein each of the at least one first device is represented as an icon in the first heads-up display to provide information in response to establishing the interaction with that first device.

16. The method of claim 1, wherein the first heads-up display and the at least one first device each include a corresponding one of at least one second device comprising a transmitter and receiver to transmit and receive signals, and establishing the interaction further comprises:
  performing the interaction via one or more from a group of a network connection and signals exchanged between the transmitter and receiver of the first heads-up display and the at least one first device.

* * * * *